No. 732,607. PATENTED JUNE 30, 1903.
F. B. & C. H. UMSTEAD.
APPARATUS FOR MAKING ARTIFICIAL STONE FOR BUILDING PIERS,
DRY DOCKS, BREAKWATERS, &c.
APPLICATION FILED NOV. 19, 1902.
NO MODEL. 2 SHEETS—SHEET 1.
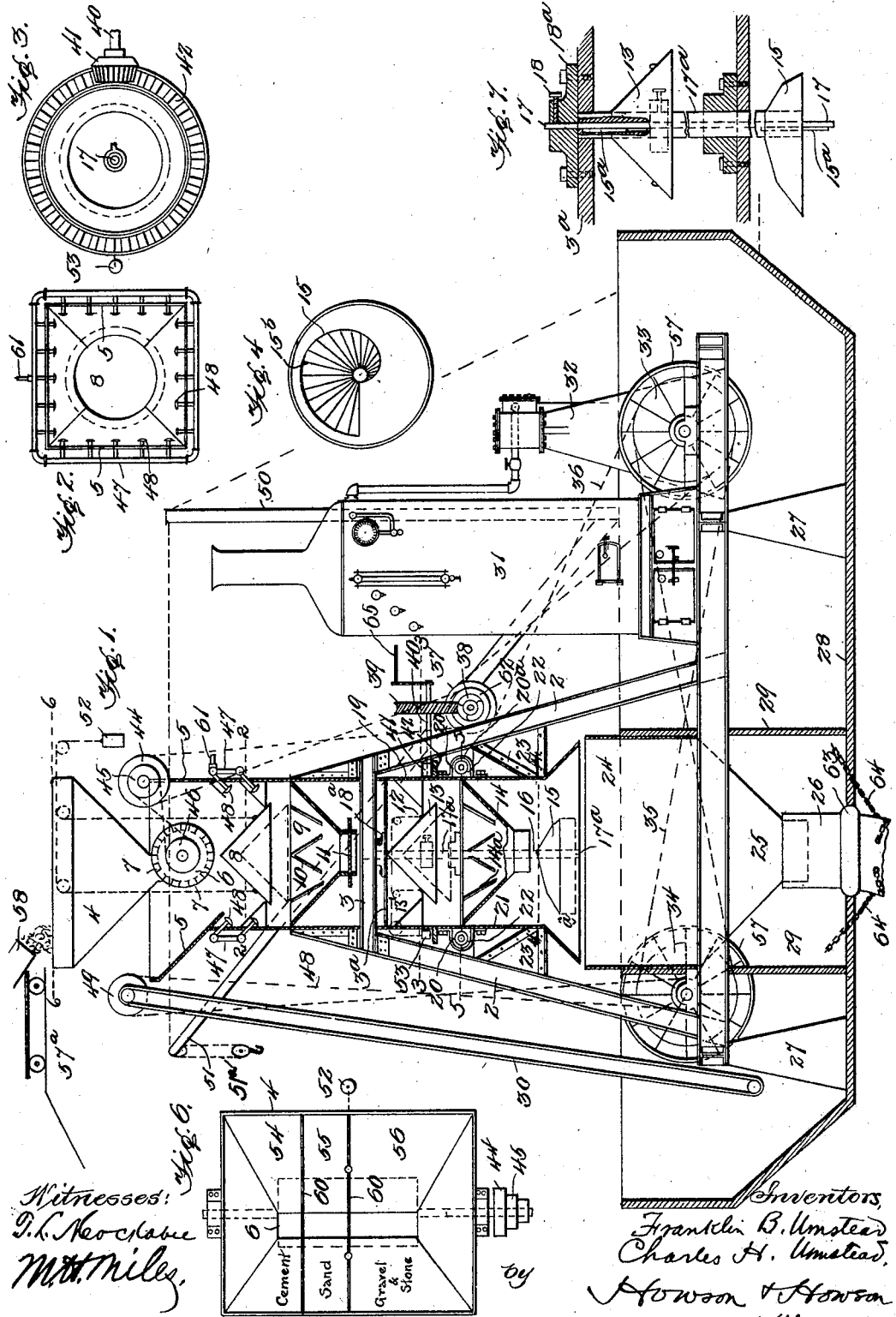

No. 732,607. PATENTED JUNE 30, 1903.
F. B. & C. H. UMSTEAD.
APPARATUS FOR MAKING ARTIFICIAL STONE FOR BUILDING PIERS, DRY DOCKS, BREAKWATERS, &c.
APPLICATION FILED NOV. 19, 1902.
NO MODEL. 2 SHEETS—SHEET 2.
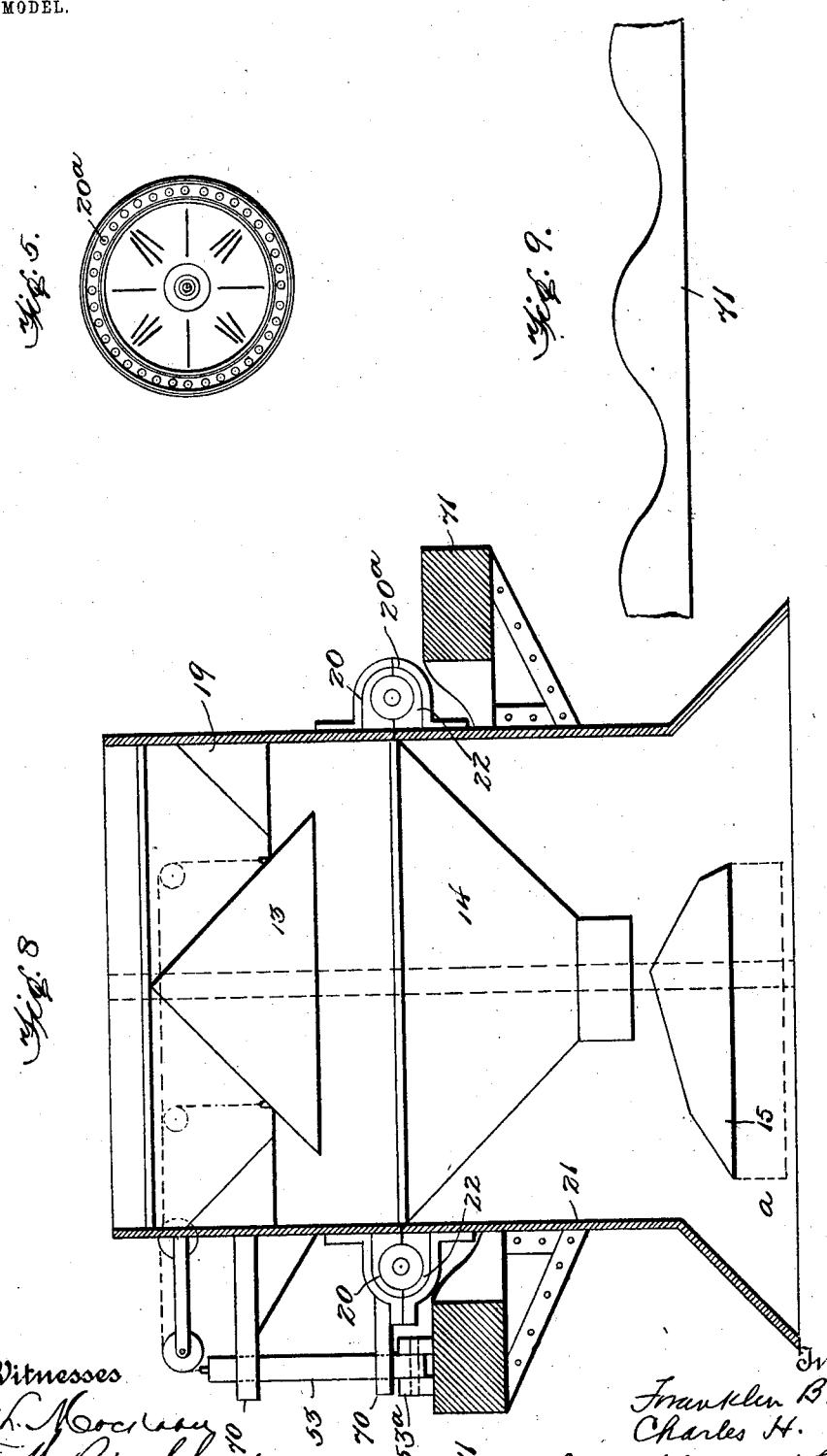

No. 732,607. Patented June 30, 1903.

UNITED STATES PATENT OFFICE.

FRANKLIN B. UMSTEAD AND CHARLES H. UMSTEAD, OF PHILADELPHIA, PENNSYLVANIA.

APPARATUS FOR MAKING ARTIFICIAL STONE FOR BUILDING PIERS, DRY-DOCKS, BREAKWATERS, &c.

SPECIFICATION forming part of Letters Patent No. 732,607, dated June 30, 1903.

Application filed November 19, 1902. Serial No. 132,000. (No model.)

*To all whom it may concern:*

Be it known that we, FRANKLIN B. UMSTEAD and CHARLES H. UMSTEAD, citizens of the United States, and residents of Philadelphia, county of Philadelphia, State of Pennsylvania, have invented certain new and useful Improvements in Apparatus for Making Artificial Stone for Building Piers, Dry-Docks, Breakwaters, &c., of which the following is a specification.

Our invention relates to apparatus for making artificial-stone piers, dry-docks, and breakwaters, and particularly to such apparatus as are adapted for the building of stone piers, stone-lined reservoirs, dry-docks, breakwaters, and the like, wherein the separate ingredients may be uniformly and thoroughly mixed and, when desired, deposited without loss of time or involving extra handling at the proper places where it is intended to apply the artificial stone so constituted, and our object is to provide an apparatus of this character which will insure uniformity of mixture of the ingredients, thereby effecting not only the efficient production of an artificial stone of uniform texture throughout, but facilitating the building of artificial-stone-lined reservoirs, stone piers, and the like.

With these objects in view our invention consists in the novel construction and combination of parts and details thereof, as hereinafter described with reference to the accompanying drawings and more particularly pointed out in the claims.

In the drawings, Figure 1 is a sectional side elevation of an apparatus embodying our invention mounted upon a float in position for building a stone pier or the like. Fig. 2 is a transverse section of the cylindrical structure on the line 2 2, Fig. 1. Fig. 3 is a similar view on the line 3 3, Fig. 1. Fig. 4 is a similar view on the line 4 4, Fig. 1. Fig. 5 is a similar view on the line 5 5, Fig. 1. Fig. 6 is a top plan view of the main hopper on the line 6 6, Fig. 1. Fig. 7 is a sectional detail hereinafter referred to. Fig. 8 is an enlarged sectional detail view of a modification, and Fig. 9 is a detail view of a cam employed therewith.

Referring to the drawings, in which the same reference characters relate to the same or corresponding parts in all the views, we have shown our apparatus as mounted upon a float 28, although it is to be understood that it is not limited to the position there shown, as one of the essential characteristics is portability, and the supporting-frames and the whole structure are so designed that the apparatus may not only be transported from place to place within the designated locality, but may be taken from place to place when needed, and it is so constructed as to be susceptible of such transportation as is required by this range of movement or used in a permanently-located plant or place, as desired.

As shown, the float 28 is provided with two bulkheads 29, upon and between which the apparatus is mounted. The apparatus is supported upon a suitable frame 1, consisting of, preferably, steel I-beams, from which extend similar vertically-disposed beams 2, to which the various parts are attached by angle-irons 23, angle-bars, bolts, &c., and braced by similar cross-beams 3. The base girders or beams 1 are shown as mounted upon removable base or pedestal blocks 27, which may be used as additional supports in the float 28, but need not be employed there unless desired, if permanent supports are attached to the float, although they are required when the apparatus is set up on land in order to clear the wheels, shafts, &c., of the structure from the ground. The main hopper 4 is arranged at the top of the apparatus and is divided by partitions 60 into three separate compartments 54, 55, and 56, each adapted to receive, respectively, the different ingredients—such as cement, sand, gravel, and stone—and this hopper is provided with a discharge-opening adapted to direct the material upon a horizontally-rotating drum 6, divided circumferentially into a suitable number of pockets or recesses 7—say from twenty to thirty—and longitudinally into three divisions corresponding to the compartments of the hopper 4, thereby constituting pockets into which the material is directed from the main hopper 4, thus providing means for feeding from the main hopper a predetermined and measured quantity of each of the ingredients. This feeding and measuring drum 6 is rotatably mounted on a shaft supported upon a hopper structure 5, the lower end of which hopper is closed by a vertically-movable bell 8, which is accurately counterbalanced by means of a counter weight or weights 52, the latter of which may be raised and lowered when desired to cut off or regulate the flow of material from the hopper 5 through a discharge-opening, the area of which is determined by position of the distributing-bell 8. When it is desired to cut off the flow of material from the hopper 5, the bell 8 is raised, thereby closing the discharge-opening from the hopper 5. The material is discharged into a distributing-hopper 9 of conical contour, on the interior surface of which is disposed a series of angularly-disposed deflecting ribs or plates 10. In the bottom of this hopper is conventionally represented a slide-valve 11, which may be closed when it is desired to shut off the material for any reason in the course of mixing. This hopper 9 is rigidly supported in the hopper structure 5 and is adapted to further mix the ingredients through the medium of the deflecting ribs or plates 10, which impart to the material motion in different directions, which intersect one another, as it is delivered from the bell 8. Located at a suitable point around the interior of the hopper 5 is a water or other liquid supply system of pipes 47, terminating in rose-jets 48, so disposed as to direct the water upon the falling mass of mixing ingredients as the latter descends into the mixing-hopper 9. This supply system derives its supply from any suitable reservoir through a pipe 61, which in a cold climate or in freezing weather may be connected to the boiler 31, which is mounted upon the base structure 1 and is adapted to supply steam to the engine 32, conventionally shown as a suitable means for furnishing motive power to the different parts of the apparatus, as well as for transportation of the same, it being understood, of course, that any suitable motive power may be used— such as electrodynamo, steam, hydraulic, or other power—as well as manually-operated mechanism, for this purpose.

Below the collecting and mixing hopper 9 is a rotating cylinder 19, revolubly supported by means of a bearing 20 upon a fixed lower casing 21, to the latter of which one half of the bearing structure 22 is secured, the other half, 20, being attached, as indicated, to the cylinder 19, and between which two bearing-surfaces ball-bearings 20$^a$ are disposed. Fixed to the lower cylindrical casing 21 is a distributing and collecting cone 14, provided with angularly-disposed deflecting-ribs 14$^a$ on its interior surface, and passing through the fixed casing 21 and revolving cylinder 19 is a tubular shaft 17$^a$, on which are mounted the lower distributing-bell 13 of the hopper 13' and a spiral distributer 15, having ribs 15$^b$ radiating from the shaft at its lower end, said two distributers being secured to a vertical shaft 17, passing through the tubular or hollow shaft 17$^a$ and rigidly secured to the rotating cylinder 19 by a set-screw 18 passing through a bearing-collar 18$^b$, attached to a cross-bar 3$^a$ on the cylinder. The tubular shaft to which the two distributers are fixed is splined to the shaft 17 by means of feathers or splines 15$^a$, (see Fig. 7,) so as to be capable of longitudinal movement with respect thereto, but compelled to rotate with the rotating cylinder and the said shaft 17. The bell 13 is connected to a suitable balance-weight 53 by means of a cord or chain passing over the pulleys and attached to the eyes 12 on opposite sides of the bell, and it will be seen that as the weight 53 is moved up and down the bell 13 and the spiral distributer 15 will be caused to move vertically the distance equal to that indicated by the letter $a$, showing the extreme limits of movement of the said bell and distributer, Fig. 7 representing these parts in their extreme upper position. Attached to the outer periphery of the revolving cylinder 19 is a circular rack 42, engaged by a pinion 41 on the shaft 40, carrying a worm-gear 39, meshing with a worm-screw 38, operated by a pulley 37 and a belt 36, passing around the main driving-pulley 33 of the engine 32. As the pulley 33 turns it will be observed that rotary motion is conveyed to the screw 38, thence to the worm-gear 39, the rack and pinion, and thence to the rotating cylinder 19.

From the spiral distributer 15 the material is directed to the receiving-chamber 24, terminating in the hopper-discharge 25, the outlet of which is shown as directing the material into a pipe 26, having a swivel-joint 63 with the float, so that it may be swung in any direction within the limits of the field of operations to direct the mixed material onto the bed of the pier or reservoir or other place when needed, such lateral swinging movements of the pipe 26 being effected by any suitable means, as by chains 64, operated from the float or other place, by a derrick, or by a crane of any suitable type.

Motion from the driving drum or wheel 33 is conveyed to the measuring and distributing cylinder or drum 6 through the medium of the belt 36, the pulleys 62, 44, 45, and 46, and the intervening belts shown, and where it is desired to elevate the material by means of an ordinary conveyer, either a flight or bucket, (conventionally indicated by the numeral 30,) motion is transmitted for this purpose from the driving-drum 33, the belt 35 to the pulley 34, the belt 48 to the pulley 49.

In the practice of our invention in order to effect a thorough and uniform mixture of the material, so that the resulting texture of the artificial stone will be of uniform consistency, and therefore more durable and effective, we load each successive conveyer bucket or flight with the proper amount of different ingredients, taking care that no two successive conveyer buckets or flights shall be loaded with a like material, so that when the same is discharged into the hopper 5 or, if desired, into the hopper 4 the resulting mixture will be practically uniform at the entering end of the apparatus, and as the material is successively fed downward and distributed by the bell 8, the hopper 9, bell 13, hopper 14, and the spiral distributer 15 a more uniform texture of the resulting mixture is assured, approaching as near as practicable the best possible consistency, the vertical motion of the bell 13 and the spiral distributer 15 materially aiding in accomplishing this result.

When the conveyer 30 is used and the material loaded in the manner defined, it may not be necessary to use the main hopper 4 and its coöperating distributing and measuring cylinder 6, since the loading of the conveyer-buckets with the successive charges of different ingredients will give a suitably uniform mixture, because the capacity of each bucket or flight is the same, and hence the function of the measuring-drum is practically accomplished; but when the materials are conveyed to the apparatus by cars or wagons 58, running up an incline 57a, such carriers are transported in such sequence that a predetermined quantity of the mixture will be delivered to the mixing apparatus below said hopper. Wheels 57 are mounted upon shafts supported in bearings on the frame 1 and driven from the engine 32 when it is desired to transport the structure from place to place, such wheels being cleared of the ground or base when the pedestal-blocks 27 are put in place or, as is evident, when the apparatus may be transported by any power.

We have shown in a conventional manner a derrick 50 on the float, having its jib 51 provided with a block and tackle 51a, which may be utilized to place the apparatus in position on the float and for other purposes, and while we have indicated a steam-motor as a suitable driving power for the various parts of the apparatus it is evident that other means may be employed for the purpose, dependent upon the surrounding conditions and upon the requirements of the case, and, for example, when small quantities are to be mixed, rendering a large apparatus unnecessary, a hand-winch 65 may be mounted on the shaft 40 for transmitting motion to the rotating cylinder 19 and the other parts of the apparatus.

It will be observed that in our apparatus the different ingredients may be fed in measured quantities to the feed-hopper, and thence measured quantities of the mixture resulting from the discharge of the ingredients from the hopper may be fed to the system of distributing and collecting devices, which preferably act alternately upon the flowing mass, so as to thoroughly mix the ingredients thereof, and while we have shown cone distributers and collecting-chambers it will be understood that our invention is not limited to the specific forms shown, nor is it necessary that the main hopper be a single structure divided by partitions, since it is evident that a plurality of separate hoppers arranged to direct material to the distributing and collecting system may be used with similar effect and the relative arrangement of the distributing and collecting devices may be varied, according to circumstances, though it is preferred to alternate these in position and action.

Instead of operating the counterweight 53 by manual means a preferable construction is the modification shown in Fig. 8, where the counterweight 53 is operatively connected with the mechanism which operates the revolving cylinder 19 and its attached spiral and hopper, the lower end of the weighted arm 53 engaging a cam 71, (shown in detail in Fig. 9,) which is adapted to impart a vertical motion to the spiral deflector 15 through the distance $a$. The cam 71 is supported upon brackets on the outside of the fixed cylinder 21, and the weighted arm 53a is preferably guided by guides 70.

We claim as our invention—

1. In an apparatus for making artificial stone, the combination with a feed-hopper into which the different ingredients are supplied, a counterbalanced distributing device adapted to control the flow of material from the hopper, a collecting device for receiving the material from the distributing device, a distributing device for distributing the material as it flows from said collecting device, and a collecting-casing having a discharge for directing the mixed material to a place of deposit, substantially as described.

2. In an apparatus for making artificial stone, the combination with a feed-hopper structure in which the different ingredients are fed in measured quantities, of distributing and collecting devices for acting upon the material as it is discharged from the hopper, means for moving the distributing devices so as to control the flow of material from the collecting devices or cut off said flow, and means for directing the mixed material to the desired point, substantially as described.

3. In an apparatus for making artificial stone, the combination with a feed-hopper structure into which the different ingredients may be fed in measured quantities, of distributing and collecting devices for intermingling the different ingredients, a liquid-supply system interposed between the feed-hopper and the distributing device for directing liquid into the flowing mass, and means for directing the delivery of material to the point desired, substantially as described.

4. In an apparatus for making artificial stone, the combination of a feed-hopper structure consisting of an upper hopper to which the different ingredients may be supplied in measured quantities and a hopper below the same for collecting the material in a mixed state as it flows from the main hopper, a measuring device interposed between the two for receiving the mixture from the main hopper and delivering it to the lower hopper, and distributing and collecting devices below the same for thoroughly mixing the ingredients, and means for directing the mixture to the point desired, substantially as described.

5. In an apparatus for making artificial stone, the combination of a feed-hopper structure consisting of an upper hopper to which the different ingredients may be supplied in measured quantities and a hopper below the same for collecting the material in a mixed state as it flows from the main hopper, a measuring device interposed between the two for receiving the mixture from the main hopper and delivering it to the lower hopper, a liquid-supply system arranged to discharge liquid into the flowing mass as it leaves the lower hopper, and means for directing the mixture to the point desired, substantially as described.

6. In an apparatus for making artificial stone, the combination of a feed-hopper structure consisting of an upper hopper to which the different ingredients may be supplied in measured quantities and a hopper below the same for collecting the material in a mixed state as it flows from the main hopper, a measuring device interposed between the two for receiving the mixture from the main hopper and delivering it to the lower hopper, and distributing and collecting devices below the same for thoroughly mixing the ingredients, a liquid-supply system arranged to direct liquid into the flowing mass as it is discharged from the lower hopper, and means for directing the mixture to the point desired, substantially as described.

7. In an apparatus for making artificial stone, the combination with a feed-hopper into which the different materials are fed in measured quantities, of distributing and collecting devices for receiving the material from said hopper and thoroughly mixing the same as it flows through the apparatus, said devices consisting of one or more distributing-cones movable vertically to control the flow of material, and collecting-chambers having discharge-openings governed by the said distributing devices, means for moving the distributing cones or devices so as to govern such flow, and a collecting-hopper having a discharge for directing the material to the place of deposit, substantially as described.

8. In an apparatus for making artificial stone, the combination with a suitable supporting structure, of a main feed-hopper into which the material may be fed in measured quantities, distributing and collecting devices alternately acting upon the material to thoroughly mix the different ingredients as they are fed downwardly from the main hopper, said distributing device or devices being movably mounted so as to control or cut off the flow of material from the respective collecting chamber or device, and a spiral distributer rotatably mounted at the lowest point of the mixing system of distributers and collectors, and a collecting discharge-hopper into which the material is directed from said spiral distributer and having a discharge-opening for directing the material to the place of deposit, substantially as described.

9. In an apparatus for making artificial stone, the combination with a suitable supporting structure, of a main feed-hopper into which the different ingredients may be fed in measured quantities, one or more distributing devices and collecting-chambers alternately acting upon the material to thoroughly mix the same as it flows from the main feed-hopper structure, counterbalanced weights connected to the distributers for maintaining the same in different positions with respect to the collecting-chambers coöperating therewith, one of said collecting-chambers having means for rotating the same and with it the distributing device, and a collecting and discharge hopper provided with a discharge-opening for directing the material to the place of deposit, substantially as described.

10. In an apparatus for making artificial stone, the combination with a suitable base and float on which the same is mounted, of a mixing apparatus comprising a main hopper structure into which the different ingredients may be fed in measured quantities, distributing and collecting devices interposed between the main feed-hopper structure and the point of discharge, and means for feeding the ingredients to the main hopper structure, and a chute for discharging material from the mixing apparatus, substantially as described.

11. In an apparatus for making artificial stone for building piers and the like, the combination with a float having an opening in the bottom and a chute connected thereto, of a mixing apparatus consisting of the main feed-hopper structure into which the different ingredients may be fed in measured quantities, and distributing and collecting devices intervening between said hopper structure and said discharge-chute, substantially as described.

12. In an apparatus for making artificial stone for building piers and the like, the combination with a float having an opening in the bottom and a chute connected thereto, of a mixing apparatus comprising a main feed-hopper structure into which the different ingredients may be fed in measured quantities, a conveyer for transporting the ingredients to the feed-hopper, distributing and collecting cones interposed between the main hopper and the discharge-chute and acting alternately upon the material to thoroughly mix the ingredients, with means for moving the distributing-cones with respect to the collecting-cones for controlling or cutting off the flow of material therefrom, one of said distributers having spirally-disposed ribs for distributing the material as it is discharged in the collecting-chamber above the chute, and means for operating the movable parts, substantially as described.

13. In an apparatus for making artificial stone for building stone piers and the like, the combination with a float having an opening in the bottom and a chute connected thereto, a mixing apparatus consisting of a main feed-hopper structure into which the material may be fed in measured quantities, means for conveying the measured quantities of material of the different ingredients to said feed-hopper structure, distributing and collecting devices interposed between the feed-hopper and discharge-chute, a water-supply system adapted to direct water into the flowing mass as it is discharged from the hopper structure, and a collecting-chamber of the system rotatably mounted upon the fixed structure with means for causing its distributing device to rotate therewith, and means for moving the said distributing device longitudinally with respect thereto, substantially as described.

14. In an apparatus for making artificial stone for building stone piers and the like, the combination with a float having an opening in the bottom and a chute connected thereto, of a mixing apparatus having a main feed-hopper into which the different ingredients may be fed in measured quantities, means for conveying the different ingredients successively in measured quantities to said feed-hopper, and distributing and collecting means interposed between the feed-hopper and the discharge-chute, said distributers having counterbalanced weights adapted to maintain the same in different positions of adjustment, and a water-supply system for directing the water onto the flowing mass of the discharge from the main feed-hopper, substantially as described.

15. In an apparatus for making artificial stone, the combination with a main feed-hopper into which the different ingredients may be fed in measured quantities, the combination of distributing and collecting cones adapted to thoroughly mix the ingredients flowing from the feed-hopper, a collecting-chamber at the lower portion of the apparatus rotatably mounted thereon, a vertical shaft mounted in bearings in the fixed structure and rotating with the rotatable collecting-chamber, a distributing device confined to said shaft but movable longitudinally thereof, a spiral distributing device similarly disposed with reference to said shaft, and means for rotating the said collecting-chamber, substantially as described.

16. In an apparatus for making artificial stone, the combination with a main feed-hopper into which the different ingredients may be fed in measured quantities, the combination of distributing and collecting cones adapted to thoroughly mix the ingredients flowing from the feed-hopper, a collecting-chamber at the lower portion of the apparatus rotatably mounted thereon, a vertical shaft mounted in bearings in the fixed structure and rotating with the rotatable collecting-chamber, a distributing device confined to said shaft but movable longitudinally thereof, a spiral distributing device similarly disposed with reference to said shaft, and a fixed collecting-chamber interposed between the two said distributing devices, substantially as described.

17. In an apparatus for making artificial stone for building piers, &c., the combination with a suitable supporting structure, of a feed-hopper into which the different ingredients are fed, a distributing-bell adapted to direct material from said hopper downwardly, a collecting-hopper to receive said material, a rotatable casing for receiving the material from said drum, distributing and collecting devices below the same for receiving and distributing the material therefrom, and a pipe or conduit for directing the mixed material from the latter to the place of deposit, substantially as described.

18. In an apparatus for making artificial stone for building piers, &c., the combination with a suitable supporting structure, of a feed-hopper into which the different ingredients are fed, a distributing-bell adapted to direct material from said hopper downwardly, a collecting-hopper fixed below the same and having ribs on its interior surface for changing the direction of the flow of the material to cause intermingling, and a discharge-pipe for directing the material to the place of deposit, substantially as described.

19. In an apparatus for making artificial stone for building piers, &c., the combination with a suitable supporting structure, of a feed-hopper into which the different ingredients are fed, a distributing-bell adapted to direct material from said hopper downwardly, a collecting-hopper fixed below the same having ribs on its interior surface for changing the direction of the flow of the material, and a spirally-ribbed distributer adapted to receive the material from the latter hopper, and a collecting-hopper for receiving the material from said distributer and provided with a discharge-pipe for delivering material therefrom to the place of deposit, substantially as described.

20. In an apparatus for making artificial stone, &c., the combination with a fixed casing, of a rotating collecting-casing and a distributing-bell suspended therein and rotating therewith but free to move longitudinally thereof, with means for rotating said collecting-casing, substantially as described.

21. In an apparatus for mixing different ingredients, the combination with a fixed casing, of a rotating collecting-casing mounted thereon, a distributing-bell suspended in and rotating with said casing but movable longitudinally thereof, and counterbalance devices for said bell, substantially as described.

22. In an apparatus for mixing different ingredients, the combination with a fixed chamber, of a rotatable casing, a shaft fixed to said casing, a hollow shaft to which the collecting-casing is secured slidably mounted on said shaft, and a distributing-bell and spiral distributer rigidly attached to the hollow shaft, and means for rotating the collecting-casing, substantially as described.

23. In an apparatus for mixing different ingredients, the combination with a fixed collecting-casing, of a rotatable collecting-casing mounted thereon, means for rotating the same, a shaft extending through both casings and fixed to the rotating casing, a hollow shaft slidably mounted on said shaft but rotating therewith, a cone distributing-bell fixed to the hollow shaft within the rotatable casing, and a spiral distributer fixed to said hollow shaft below said casing, substantially as described.

In testimony whereof we have signed our names to this specification in the presence of the subscribing witnesses.

FRANKLIN B. UMSTEAD.
CHARLES H. UMSTEAD.

Witnesses as to the signature of Franklin B. Umstead:
C. H. STAMBAUGH,
C. D. GOODRICH.

Witnesses as to the signature of Chas. H. Umstead:
FREDERIC A. HILLS,
FREDERICK H. COOKE.